United States Patent
Musgrove et al.

(10) Patent No.: US 6,725,222 B1
(45) Date of Patent: *Apr. 20, 2004

(54) AUTOMATED ON-LINE COMMERCE METHOD AND APPARATUS UTILIZING SHOPPING SERVERS WHICH UPDATE PRODUCT INFORMATION ON PRODUCT SELECTION

(75) Inventors: Timothy A. Musgrove, Morgan Hill, CA (US); Robert Hood, San Jose, CA (US)

(73) Assignee: CNET Networks, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/373,881

(22) Filed: Feb. 27, 2003

Related U.S. Application Data (63) Continuation of application No. 09/566,734, filed on May 9, 2000, now Pat. No. 6,535,880.

(51) Int. Cl.⁷ .............................................. G06F 17/30
(52) U.S. Cl. ........................................... 707/10; 705/27
(58) Field of Search .......................... 707/1, 10, 104.1; 705/26, 27

(56) References Cited

U.S. PATENT DOCUMENTS

| | | | |
|---|---|---|---|
| 4,707,592 A | 11/1987 | Ware | 235/379 |
| 5,319,542 A | 6/1994 | King, Jr. et al. | 705/27 |
| 5,420,926 A | 5/1995 | Low et al. | 705/74 |
| 5,550,746 A | 8/1996 | Jacobs | 700/231 |
| 5,592,375 A | 1/1997 | Salmon et al. | 705/7 |
| 5,666,493 A | 9/1997 | Wojcik et al. | 705/26 |
| 5,671,279 A | 9/1997 | Elgamal | 705/79 |
| 5,710,887 A | 1/1998 | Chelliah et al. | 705/26 |
| 5,715,314 A | 2/1998 | Payne et al. | 705/78 |
| 5,727,048 A | 3/1998 | Hiroshima et al. | 379/93.12 |
| 5,742,768 A | 4/1998 | Gennaro et al. | 1/1 |
| 5,758,328 A | 5/1998 | Giovannoli | 705/26 |
| 5,758,329 A | 5/1998 | Wojcik et al. | 705/26 |
| 5,761,649 A | 6/1998 | Hill | 705/27 |
| 5,765,143 A | 6/1998 | Sheldon et al. | 705/28 |
| 5,774,872 A | 6/1998 | Golden et al. | 705/19 |
| 5,778,173 A | 7/1998 | Apte | 713/201 |
| 5,790,426 A | 8/1998 | Robinson | 702/179 |
| 5,790,677 A | 8/1998 | Fox et al. | 705/78 |
| 5,794,207 A | 8/1998 | Walker et al. | 705/1 |
| 5,794,221 A | 8/1998 | Egendorf | 705/40 |

(List continued on next page.)

OTHER PUBLICATIONS

US 5,894,520, 4/1999, Nielsen (withdrawn)
Poley et al "The Potential for Trade Facilitated by the Internet 1996–2000: a Review of Demand Supply and Internet Trade Models" Jan. 1998, Proceedings of the Thirty–First Hawaii International Conference on System Sciences, vol. 4, PP 21 221.*
Jones et al "IndustryNet: a Model for Commerce on the World Wide Web" Oct. 1995, IEEE Expert, vol. 10 No. 5, p. 54–59.*

*Primary Examiner*—Jack Choules
(74) *Attorney, Agent, or Firm*—Nixon Peabody, LLP; Marc S. Kaufman (57) ABSTRACT

An on-line commerce method and apparatus. A user can select products for purchase from plural merchant servers by examining product information stored on a shopping server. The product information related to selected products is verified by accessing a checkout page of each merchant server. The verified information is then presented to the user for confirmation. Upon confirmation, buy procedures are executed on each merchant server to purchase the products using existing account information for the user at each merchant server.

23 Claims, 4 Drawing Sheets

U.S. PATENT DOCUMENTS

| | | | |
|---|---|---|---|
| 5,802,497 A | 9/1998 | Manasse | 705/27 |
| 5,815,665 A | 9/1998 | Teper et al. | 709/229 |
| 5,825,884 A | 10/1998 | Zdepski et al. | 705/78 |
| 5,832,459 A | 11/1998 | Cameron et al. | 705/26 |
| 5,842,178 A | 11/1998 | Giovannoli | 705/26 |
| 5,878,141 A | 3/1999 | Daly et al. | 705/78 |
| 5,878,401 A | 3/1999 | Joseph | 705/22 |
| 5,895,454 A | 4/1999 | Harrington | 705/26 |
| 5,898,777 A | 4/1999 | Tycksen, Jr. et al. | 705/53 |
| 5,899,980 A | 5/1999 | Wilf et al. | 705/26 |
| 5,909,492 A | 6/1999 | Payne et al. | 705/78 |
| 5,909,673 A | 6/1999 | Gregory | 705/45 |
| 5,930,768 A | 7/1999 | Hooban | 705/27 |
| 5,930,777 A | 7/1999 | Barber | 705/40 |
| 5,953,707 A | 9/1999 | Huang et al. | 705/10 |
| 5,961,593 A | 10/1999 | Gabber et al. | 709/219 |
| 5,966,697 A | 10/1999 | Fergerson et al. | 705/26 |
| 5,970,472 A | 10/1999 | Allsop et al. | 705/26 |
| 5,970,475 A | 10/1999 | Barnes et al. | 705/27 |
| 5,971,273 A | 10/1999 | Vallaire | 235/381 |
| 5,983,203 A | 11/1999 | Church et al. | 705/35 |
| 5,991,739 A | 11/1999 | Cupps et al. | 705/26 |
| 5,999,908 A | 12/1999 | Abelow | 705/1 |
| 5,999,919 A | 12/1999 | Jarecki et al. | 705/40 |
| 6,002,771 A | 12/1999 | Nielsen | 705/76 |
| 6,006,200 A | 12/1999 | Boies et al. | 705/26 |
| 6,023,683 A | 2/2000 | Johnson et al. | 705/26 |
| 6,032,130 A * | 2/2000 | Alloul et al. | 705/27 |
| 6,154,738 A | 11/2000 | Call | 707/4 |
| 6,185,608 B1 | 2/2001 | Hon et al. | 709/216 |
| 6,209,029 B1 * | 3/2001 | Epstein et al. | 709/219 |

* cited by examiner

AUTOMATED ON-LINE COMMERCE METHOD AND APPARATUS UTILIZING SHOPPING SERVERS WHICH UPDATE PRODUCT INFORMATION ON PRODUCT SELECTION

BACKGROUND OF THE INVENTION

1. Field of the Invention

The invention relates to systems for the purchase of goods and services over a communications network. More specifically, the invention is an automated purchase support method and apparatus for seamlessly integrating plural merchants into an on-line shopping system.

2. Description of the Related Art

The Internet is a worldwide network of computers linked together by various hardware communication links all running a standard suite of protocols known as TCP/IP (transmission control protocol/Internet protocol). The growth of the Internet over the last several years has been explosive, fueled in the most part by the widespread use of software viewers known as browsers and HTTP (hypertext transfer protocol) which allow a simple GUI (graphical user interface) to be used to communicate over the Internet. Browsers generally reside on the computer used to access content on the Internet, i.e. the client computer. HTTP is a component of TCP/IP and provides users access to files of various formats using a standard page description language known as HTML (hypertext markup language), and more recently XML (extensible markup language) and XHTML (extensible hypertext markup language), a reformulation of HTML into XML. The collection of servers on the Internet using HTTP has become known as the "World Wide Web" or simply the "Web."

Through HTML, XHTML, and interactive programming protocols, the author of a particular Web page is able to make information available to viewers of the Web page by placing the Web page on an Internet Web server. The network path to the server is identified by a URL (Uniform Resource Locator) and, generally, any client running a Web browser can access the Web server by using the URL. A client computer running a browser can request a display of a Web page stored on a Web server by issuing a URL request through the Internet to the Web in a known manner. A URL consistent with the present invention may be a simple URL of the form:

<protocol identifiers>://<server path>/<web page path>

A "protocol identifier" of "http" specifies the conventional hyper-text transfer protocol. A URL request for a secure Internet transaction typically utilizes the secure protocol identifier "https," assuming that the browser running on the client and the Web server control program running on the Web server support and implement the secure sockets layer discussed below. The "server path" is typically of the form "prefix.domain," where the prefix is typically "www" to designate a Web server and the "domain" is the standard Internet sub-domain.top-level-domain of the Web server. The optional "web page path" is provided to specifically identify a particular hyper-text page maintained on the Web server. In response to a received URL identifying an existing Web page, the Web server can return the Web page, subject to the HTTP protocol, to the client computer for display on the client computer. Such a Web page typically incorporates both textual and graphical information including embedded hyper-text links that permit the user of the client computer to readily select a next URL or send other data over the Internet. Further, a Web page can have embedded applets, written in Java™ or another programming language, to present animation and/or audio.

The URL issued from the client computer may also be of a complex form that identifies a CGI (common gateway interface) program (or script) on the Web server. The CGI program permits interactivity between the client computer and the Web server via HTTP. CGI is a standard for external gateway programs to interface with information servers, such as Web servers. A plain HTML document that the Web server delivers is substantially static. A CGI program, on the other hand, is executed in real-time so that it can process data or execute commands, such as executing a buy procedure which authorizes a purchase of products through a commerce Web server. A HTML form definition reference that identifies a CGI program is commonly of the form:

<form action-http://www.vendor.com/cgi-bin/buy.cgi method=post>

A hyper-text link of this form directs the execution of the buy.cgi program on the Web server in response to a command from the client computer. For example, buy.cgi can be a buy procedure of the Web server. The Web has become ubiquitous in businesses and homes because it has proven to be convenient for various applications, such as news and data delivery, conducting banking and investment transactions, and the like. The Web and its authoring, transmission, and display protocols, such as browsers, HTML, CGI, Active Server Pages™, and Java™, have become a worldwide standard for information exchange.

One of the primary applications of the Web has been shopping, i.e. the purchase of goods and services, i.e. products. Virtually every major commercial "bricks and mortar" merchant has established a Web site for the showcase and sale of their products. Further many manufacturers sell products directly over the Web. Finally, a plethora of on-line merchants, not previously existing in the bricks and mortar world, have come into existence. As a result, virtually every product is available for purchase over the Web from a plurality of merchants. This situation has increased the efficiency of markets by permitting shoppers to readily compare products and terms of sale from plural merchants without the need to travel physically to the merchant locations.

However, in order to compare products and terms of different merchants, one must "visit" the various merchant web sites individually.

First, this requires knowledge of the URLs for each merchant Web site or the use of a search engine which can be cumbersome and inaccurate. It is possible to open the various sites in different browser windows for better comparison. However, the various formats of each merchant Web site render it tedious to compare products and terms directly. When a purchase decision is made, the purchase or purchases must be made through the individual merchant Web sites. Further, ordinarily the shopper is required to log in to each merchant Web site, by entering a username and password for example, prior to making a purchase and then proceed to the next site. For example, if the shopper decides to buy three items from three different merchants, three log in procedures and three buy procedures, i.e. procedures for effecting a purchase on the merchant Web sites, must be manually executed respectively through the three merchant Web sites and their proprietary interfaces.

Recently, it is known to integrate a plurality of web sites into a single environment known as a "shopping portal."

Shopping portals ordinarily include a Web server presenting an integrated interface displaying plural products from various merchants. Accordingly, conventional shopping portals facilitate comparison shopping and thus increase market efficiency. However, conventional shopping portals merely serve as a gateway to the individual merchant Web sites. In particular, when a purchasing decision is made, the shopper is directed to the merchant Web site and the purchase is completed manually through the merchant Web site using the merchant Web site buy procedures and interface. Accordingly, when purchases are made from more than one merchant, conventional shopping portals require that the shopper execute the orders using different interfaces at the respective merchant Web sites.

U.S. Pat. No. 5,895,454 discloses an interface for merchant Web sites. A shopper connects to a remote merchant Web site through a shopping server. When a product is selected from a merchant server, a transaction notification is transmitted to a database on the shopping server. When the shopper is finished shopping, the shopper server transmits purchase orders corresponding to the selected products to the merchant web sites to complete the orders on behalf of the shopper. However, the system disclosed in U.S. Pat. No. 5,895,454 requires that the shopper navigate each merchant Web site individually to select products for purchase.

SUMMARY OF THE INVENTION

It is an object of the invention to seamlessly integrate plural on-line merchants into a single shopping interface.

It is another object of the invention to facilitate comparison shopping in an on-line environment.

It is another object of the invention to retain individual merchant accounts while permitting purchasing from plural merchants through a single on-line interface.

It is another object of the invention to permit a shopper to retain the advantages of shopping at a merchant site while using an integrated shopping interface.

It is another object of the invention to permit a merchant site to obtain all the commercial advantages of an actual visit by a shopper while facilitating shopping from plural merchant sites.

To achieve these and other objects, a first aspect of the invention is method of effecting commerce in a networked computer environment comprising the steps of identifying a user of a client computer to a shopping server having a database, selecting a product, based on product information in the database, for purchase from a merchant server that is remote from the shopping server, verifying the product information related to the selected product by communicating updated information related to the selected product from the merchant server to the shopping server, presenting verified product information to the user for confirmation of a purchase, and executing a buy procedure on the merchant server for purchase of the selected products from the merchant server if the user confirms the purchase.

A second aspect of the invention is a computer architecture for effecting commerce in a networked environment comprising a client computer, a shopping server executing an agent server application and including a memory device having a database stored therein, a merchant server executing a commerce server application and being remote from the shopping server, and a communication channel coupling the merchant server with the shopping server and the shopping server with the client computer. The agent application is operative to identify a user of the client computer to the shopping server, permit the user to select a product, based on product information in the database, for purchase from the merchant server, verify the product information related to the selected product by communicating updated information related to the selected product from the merchant server to the shopping server over the communication channel, present verified product information to the user for confirmation of a purchase, and execute a buy procedure on the merchant server for purchase of the selected products from the merchant server if the user confirms the purchase.

BRIEF DESCRIPTION OF THE DRAWING

The invention is described through a preferred embodiment and the attached drawing in which.

DETAILED DESCRIPTION OF THE PREFERRED EMBODIMENT

Figure 1:
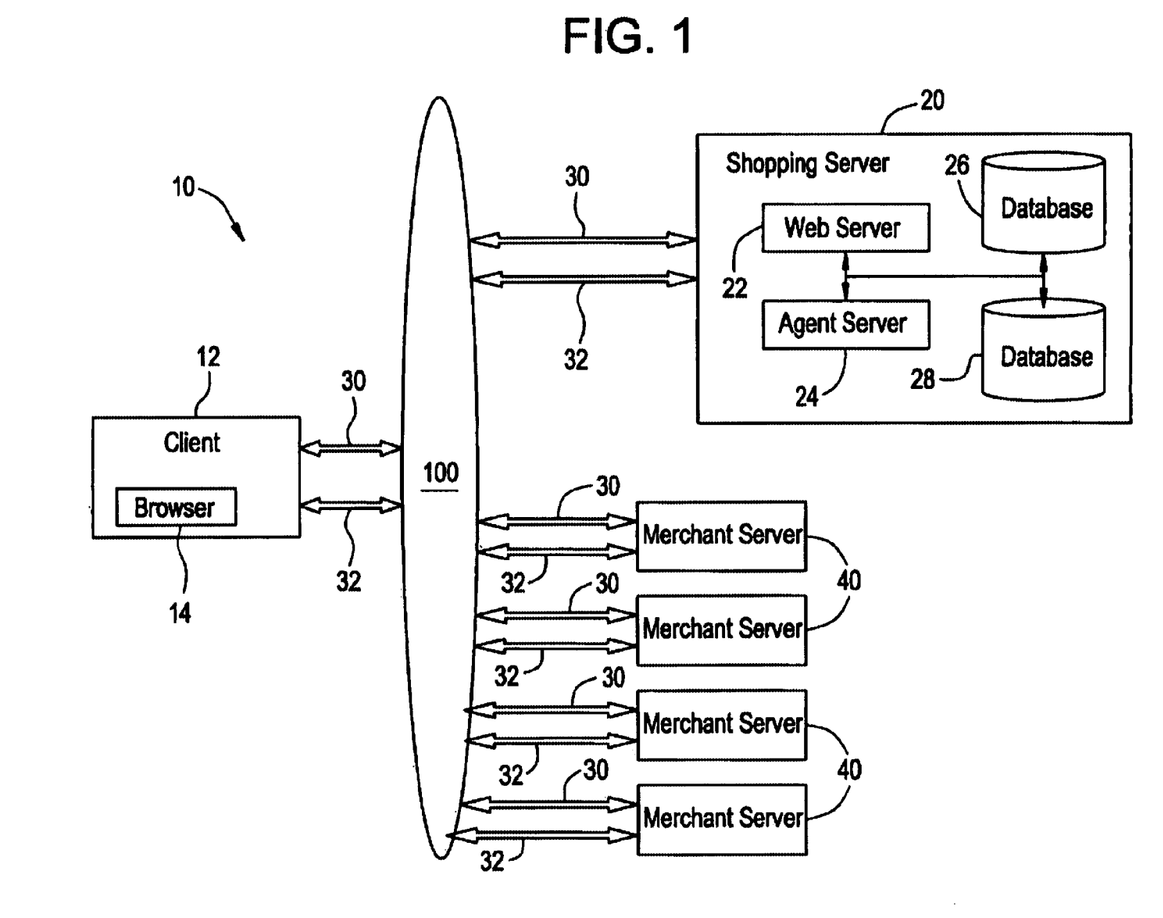
FIG. 1 is a block diagram of a computer architecture in accordance with a preferred embodiment of the invention.

A preferred embodiment of a computer architecture of the invention is illustrated in FIG. 1. Commerce system 10 includes client computer 12 executing browser application 14 that supports the HTTP protocol. Client computer 12 is connected, typically through an ISP (Internet Service Provider), to Internet 100 serving as a communication channel. For example, client computer system 12 can be coupled to the ISP via a conventional dial up connection using a modem or through a broadband connection such as ISDN (Integrated Services Digital Network), a cable modem, or a DSL (Digital Subscriber Line) connection. Shopping server 20 is also coupled to Internet 100 in a known manner. Shopping server 20 executes a Web server control application 22, known as an HTTP server application, stored in a memory device. For example, public domain web server software applications from NCSA or APACHE can be used.

Shopping server 20 also executes agent server control application 24, (the function of which is described in detail below) utilizing a secure connection for privacy. Agent server control application 24 can utilize SSL (secure sockets layer), S-HTTP (secure HTTP), or any other type of secure connection (standard protocols for transmitting private documents via the internet). SSL works by using a private key to encrypt data that is transferred over the SSL connection. It is common for Web sites to use SSL to obtain confidential user information, such as credit card numbers. As noted above, Web pages that require an SSL connection have a URL starting with "https:" instead of "http:." Whereas SSL creates a secure connection between a client and a server over which any amount of data can be sent securely, S-HTTP is designed to transmit individual messages securely.

A plurality of merchant servers 40 provide on-line shopping using conventional commerce server control applications, i.e. software that runs some of the main functions of an online storefront such as product display, online ordering, and inventory management. Merchant servers 40 and commerce server software are well known and thus are not described in detail herein.

In the preferred embodiment, each of client computer 12, shopping server 20, and merchant servers 40 are capable of communicating using a secure connection protocol, such as SSL or S-HTTP. For clarity, non secure connections 30 and secure connections 32 are illustrated separately. However, typically, these connections will be effected over the same physical connection or communication channel, such as Internet 100. Further, shopping server 20 and merchant servers 40 can have many Web pages stored in memory devices thereof as files in HTML format and/or other formats. Shopping server 20 also includes product database 26 and shopper database 28 stored in a memory device thereof as described in detail below.

Client computer 12 can request a display of a Web page stored on shopping server 20 by issuing a URL request through Internet 100 to shopping server 20. For example, a user of client computer 12, i.e. a shopper, can select a product, or plural products, for purchase by navigating Web pages stored on shopping server 20 and populated with product information from product database 26. Product database 26 can include product descriptions, pricing, delivery dates, and other product information for plural merchants and culled from merchant servers 40 using automated Web crawlers or "bots" or gathered in any other manner. The product information in product database 26 should be updated periodically to correspond with current product information on merchant servers 40. However, as will become apparent below, the product information need not be updated in real time.

The product information can be searched and displayed by product type, part numbers, price, keywords, or product features in any desirable manner using an interface of shopping server 20 as presented to the shopper by browser application 14 on client computer 12. The product information in product data base 26 relating to products from plural merchant servers 40 can be displayed side by side in the browser window of client computer 12 to permit the shopper to comparison shop and choose products from any one or more of merchant servers 40 based on the product information. For example, the user may search for all instances of a particular item by product name or part number and may select for purchase the instance from the merchant having the lowest price. For example, the shopping interface known as SMARTSHOP.COM™ can be used in connection with the invention. Upon logging in to shopping server 20, by entering a username and user id as identification data for example, a user can be identified and thus can avoid the need for reentering previously registered data and preferences.

Figure 2:
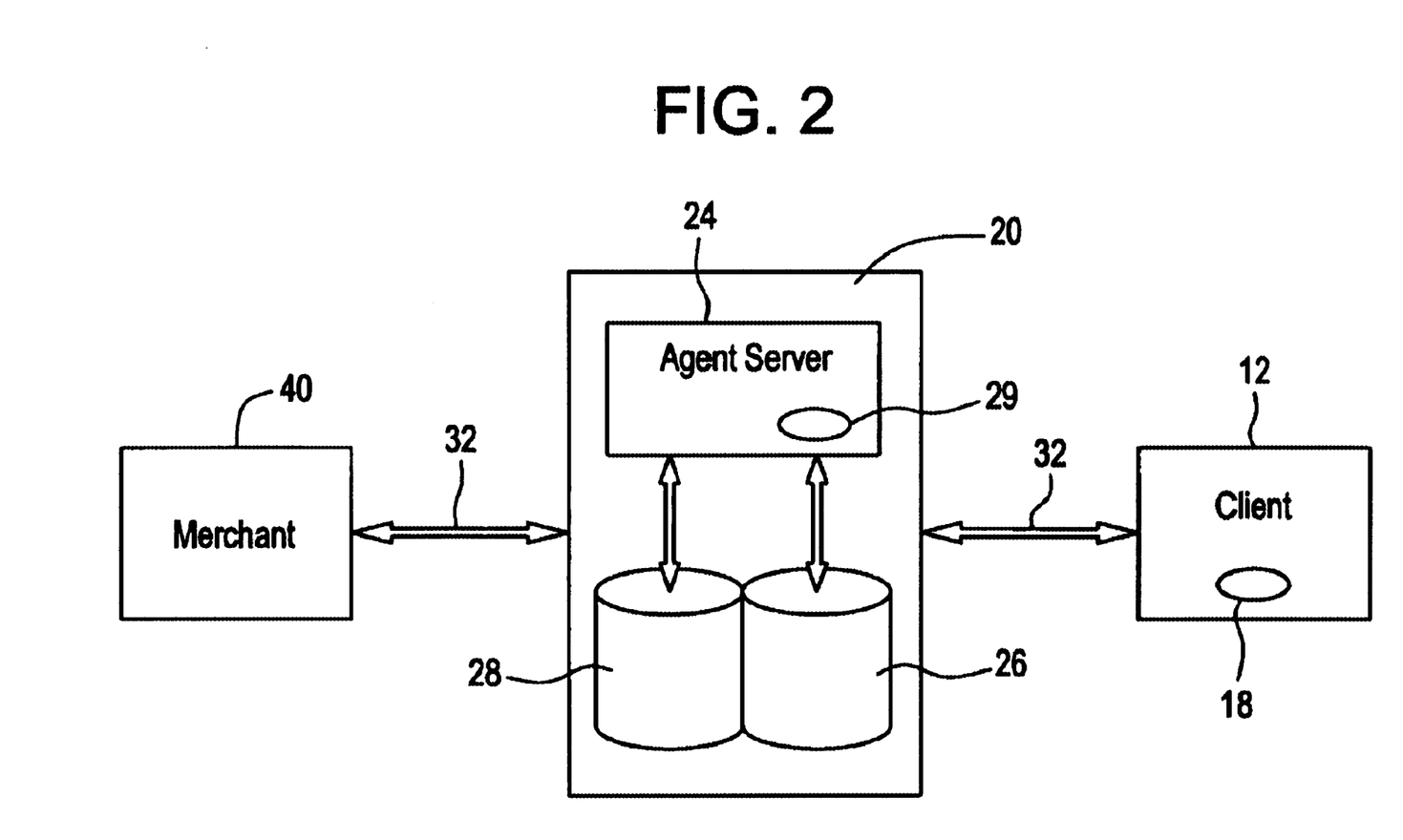
FIG. 2 is a block diagram of a portion of the architecture of FIG. 1 schematically illustrating the communication channel connections for an automated purchase procedure.

FIG. 2 schematically illustrates the communications channel connections of the preferred embodiment during an automated purchasing procedure. For the sake of clarity, the remaining description refers generally to only one merchant server 40. However, it should be understood that the procedure described below can be accomplished for plural products from plural merchant servers 40. When a user selects a product for purchase, by clicking on a "buy" button for example, secure connection 32 is established between client computer 12 and agent server application 24 of shopping server 20. Agent server application 24 then opens parallel secure connection 32 with the commerce server application of merchant server 40. Secure connections 32 are illustrated as direct connections between computers for clarity. However, it should be understood that secure connections 32 can be SSL connections over Internet 100 or any other type of communication channel.

Figure 3:
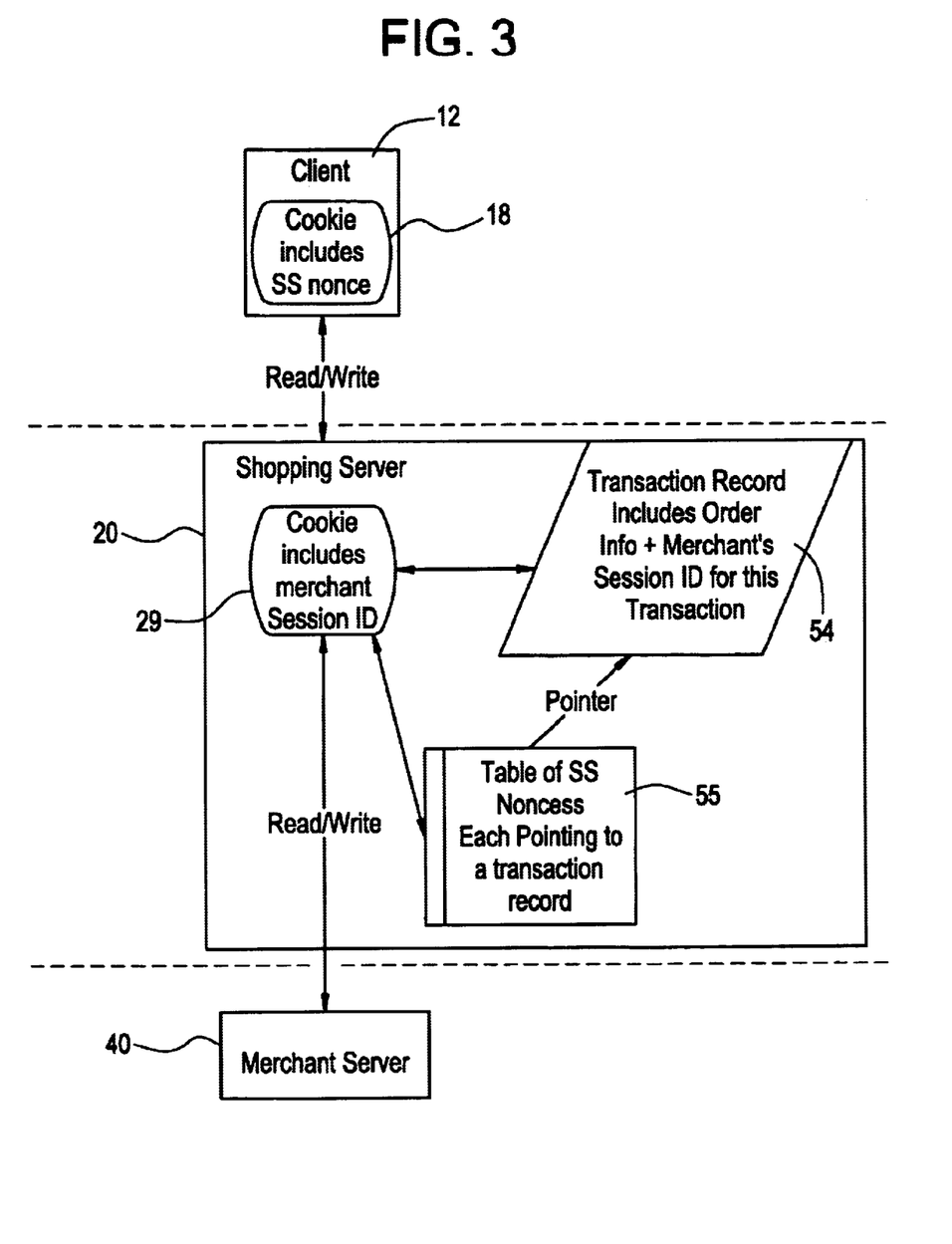
FIG. 3 is a block diagram of the cookie handling procedure of the preferred embodiment.

Also, as illustrated in FIG. 2, first "cookie" 29 (i.e. a file containing information, such as identification information, to be used by a server) is established on shopping server 20 and second cookie 18 is established on client computer 12. First cookie 29 allows merchant server 40 to track status of its order acceptance process and second cookie 18 allows shopping server 20 to track status of its order placement process. With reference to FIG. 3, first cookie 29 contains information identifying the order acceptance session between shopping server 20 and merchant server 40, i.e. a merchant session ID. The identifying information can be any character string or code by which merchant server 40 can identify the order acceptance session. Similarly, second cookie 18 contains a "nonce" (i.e. a one-time random string), or other information identifying the order placement session between client computer 12 and shopping server 20. Shopping server 20 maintains record 55, such as a database or a lookup table, that associates the nonce of second cookie 18 with the corresponding transaction record 54 (see description of FIG. 4 below), by pointing to the transaction record 54 for example. Changes in transaction reporting from merchant server 40 are recorded in transaction record 54 because the two are synchronized by virtue of pointers from the nonces to transaction record 54. Transaction record 54 also contains the corresponding merchant session ID. Accordingly, when the shopper resumes an idle session, such as by confirming an order through client computer 12, shopping server 20 examines second cookie 18 and identifies the corresponding order placement session and status and is thus able to resume the session in a secure manner. Further, shopping server 20 will locate the corresponding first cookie 29 and present it to merchant server 40 to resume the corresponding order acceptance session.

Keep in mind that there typically are a plurality of order placement and corresponding order acceptance sessions occurring simultaneously. The cookie management procedure described above allows all sessions to be correlated properly and thus permits a seamless shopping experience. Shopping server 20 uses information stored in shopper database 28 to act on the shopper's behalf during execution of a buy procedure of merchant server 40. Shopper database 28 can include any appropriate information about registered shoppers, such as their name, address, shopping preferences, credit card numbers, merchant account information (such as a username and user id for the shopper at each particular merchant), and the like. Of course all data in shopper database 28 can be collected during a registration procedure and encrypted for security in a known manner.

Figure 4:
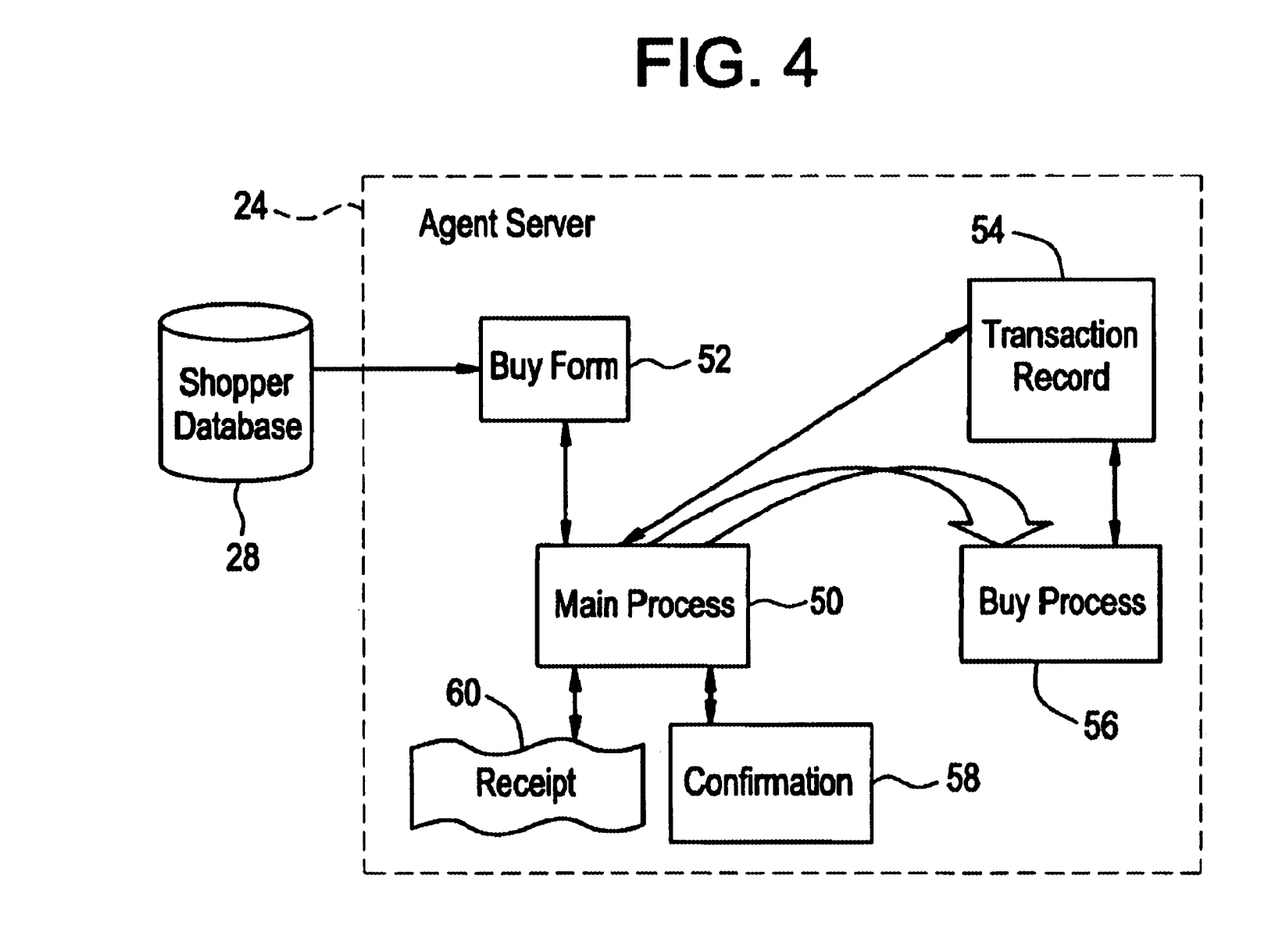
FIG. 4 is a schematic representation of the internal automated purchase procedure of the shopping server of the preferred embodiment.

FIG. 4 illustrates the purchase procedure, i.e. the function of agent server 24, of shopping server 20 in greater detail. Keep in mind that the purchase procedure ordinarily begins after the shopper has logged in to shopping server 20 or otherwise identified themselves uniquely. The first phase of the purchase procedure permits the shopper to search products, browse for products in various ways, and select one or more products for purchase from one or more merchant servers 40. After logging in, main process 50 of agent server control application 24 generates buy form 52 for display to the shopper. In the event that the shopper desires to change information in buy form 52 for the current purchase procedure, the shopper can merely edit buy form 52. For example, the shopper may wish to change the shipping address or shipment method. Of course, the shopper profile can be edited to change the default shopper information in shopper database 28. Buy form 52 is automatically pre-filled with default shopper information corresponding to the shopper if such information exists as a shopper profile in shopper database 28. If such information does not exist for the shopper, the shopper can be prompted to enter the information and the information can be used in the current purchase procedure. Main process 52 also creates transaction record 54 which keeps track of all transaction information, including transaction status, for the current transaction procedure (such as credit card information, billing addresses, and the like from shopper database 28 and merchant SKUs of selected products, shipping options, and the like from product database 26).

Also, main process 50 spawns buy process 56 and points buy process 56 to the corresponding transaction record. As the shopper selects various products and options using the browser interface of client computer 12, transaction record 54 is updated. Note that, at any given time, there can be plural purchase procedures for plural shoppers each having a respective buy process 56 and corresponding transaction record 54. Buy process 56 will continue to run in parallel with main process 50 until the purchase procedure is completed. Buy process 56 continually updates transaction record 54 based on shopper selections. Meanwhile, main process 50 polls transaction record 54 for updated status. In this manner, main process 50 is updated with the status of each purchase procedure.

When the first phase of the purchase procedure is complete, i.e. the shopper has selected all desired products and options from all desired merchants, main process 50 presents confirmation page 58 to the shopper, through the browser interface of client computer system 12, for verification of an order by the shopper. Confirmation page 58 is generated by communication between shopping server computer system 20 and the appropriate merchant server 40 using secure connection 32 between shopping server computer system 20 and the appropriate merchant server 40. In particular, shopping server computer system 20 uses the information in transaction record 54 to verify pricing information, shipping information, and other details of the desired purchase with merchant server 40 by automatically going to each merchant checkout page, or other information page, and retrieving the updated information. Buy procedures of merchant server 40 are integrated into buy processes of shopping server 20 to allow buy process 56 to automatically navigate merchant server 40. Back end test scripts or the like can be used to determine the particular buy procedure steps of merchant server 40.

If account information for a particular merchant exists for the shopper in shopper database 28, that account information is used when executing the buy procedures with the merchant server 40. If not, a new account is created for the shopper with the merchant and the account information is stored in shopper database 28 for subsequent use. Since shopping server 20 uses merchant account information that corresponds to the shopper, the shopper can retain preferred buyer points and other benefits and discounts as if shopping directly at merchant server 40.

Keep in mind that, in the preferred embodiment, up to the time of generating confirmation page 58 communication has been between client computer system 12 and shopping server 20 using information from product database 26, which might not be entirely updated due to the fluid state of on-line commerce. Accordingly, confirmation page 58 includes real-time pricing and shipping information obtained from merchant server 40 for each selected product in transaction record 54. Upon receiving shopper confirmation of the order summarized in confirmation page 58, all transaction information in transaction record 54 is saved and second cookie 18 is saved to allow the procedure to restart later on with the same user session. Buy process 56 remains idle while waiting for the shopper to confirm the order by selecting a button on confirmation page 58 or taking other action.

In the second phase of the purchase procedure, the purchase transaction is completed. In particular, second cookie 18 is used to resume the previous user session on merchant server 40. Subsequently, the order is executed on merchant server 40 using information in transaction record 54 to run a buy procedure and thus execute a buy process, on merchant server 40. The order is then confirmed on shopping server 20, transaction record 54 is updated and receipt page 60 is generated showing the transaction information and confirmation numbers and the like from merchant server 40. Once again, it is important to note that products can be selected from plural merchant servers 40 and, in such a case, plural buy procedures will be executed and confirmed on the respective merchant servers 40 using the appropriate shopper account information automatically for each merchant server 40.

It can be seen that the purchase procedure discussed above permits shopping server 20 to act on as an agent behalf of the shopper in interactions with merchant servers 40. However, some merchants do not feel comfortable with shoppers using an agent Web site. In particular, many merchants rely on advertising, affiliate programs, and the like in their business model and thus can only accomplish their business objective if the shopper "visits", i.e. directly views, their Web site and its buy pages in particular during shopping. Accordingly, a proxy server mode of shopping server 20 can be used to offer many of the advantages of the integrated purchasing procedure disclosed above, while satisfying vendors that desire to have the shopper visit their Web site buy pages.

Internet proxy servers are well known. The phrase "proxy server" refers generally to a server that sits between a client application, such as a Web browser, and a Web server to intercept requests. The proxy server then serves up substantially the same content as the Web server to which the request was directed while also performing an auxiliary function such as filtering data, monitoring data, or serving up a cached copy of the Web page. In the preferred embodiment, this general concept is expanded and applied to an integrated shopping environment. In proxy server mode, parallel secure connections 32 are set up between client computer and shopping server 20 and between shopping server 20 and merchant server 40, as illustrated in FIG. 2. The first phase of the purchase procedure is accomplished in the same manner as described above with respect to the standard mode. To utilize proxy server mode, merchant database 28 preferably includes form maps for mapping fields in the order forms of merchant server 40 to fields in shopper database 26. An external editing tool can be provided to develop the form maps in a known manner. For example, the editing tool can be configured to read the HTML forms and parse out the data fields. These data fields can then be correlated to corresponding fields in custom database 28.

During second phase of the purchasing procedure, when client computer 12 requests a Web page from merchant server 40, shopping server 20 (in proxy server mode) handles the request and filters out the HREFs, i.e. HTML document references, and POSTs, i.e. HTML form submissions, to point to shopping server 20 instead of merchant server 40. When merchant server 40 sends a blank form to client server 12, the form is intercepted by shopping server 20 and the form is filled out with information from shopper database 26. When client computer 12 posts a form back to merchant server 40, shopping server 20 reproduces the post keeping intact all changes in the form content made by the shopper. First cookie 29 and the second cookie 18 track the sessions as described above.

In proxy server mode, when the shopper selects a buy button from confirmed page 58 or another page displayed on client computer 12, the shopping cart page, or other buy page, of merchant server 40 is displayed. The shopper manually executes the buy procedure of merchant sever 40 using the interface of merchant server 40 as displayed on client computer 12. This manual procedure is accomplished for each merchant server 40 requiring the proxy mode. Accordingly, in proxy server mode, the shopper views all the buy pages and executes the buy procedures on merchant server 40. However, shopping server 20 mediates and assists in filling out forms. Other aspects of the purchase procedure using proxy server mode can be similar to the purchase procedure described above without proxy server mode.

The invention facilitates on-line commerce by permitting an integrated buying experience from plural merchants. The invention can be implemented over any type of communications channel, such as the Internet, a local area network (LAN), a wide area network (WAN), direct computer connections, or the like, using any type of communication hardware and protocols. Any type of hardware or combination of hardware can be used for the various clients and servers. Accordingly, the term "computer" as used herein, refers to any type of computing device or data terminal, such as a personal computer, a portable computer, a dumb terminal, a thin client, a hand held device, a wireless phone, or any combination of such devices. The various clients and servers can be a single computer at a single location or multiple computers at a single or multiple locations. For example a server may be comprised of a plurality of redundant computers disposed in co-location facilities at various locations to facilitate scalability. Any appropriate server or client software can be used and any communication protocols can be used. Communication can be accomplished over electric cable, fiber optic cable, any other cable, or in a wireless manner using radio frequency, infrared, or other technologies. Any interface can be used for selecting products for purchase. The various information can be stored in any format and thus the term "database" as used herein refers to any collection of information such as a database file, a lookup table, or the like.

The invention has been described through a preferred embodiment. However various modifications can be made without departing from the scope of the invention as defined by the appended claims and legal equivalents.

What is claimed is:

1. A method of effecting commerce in a networked computer environment comprising the steps of:
   identifying a user of a client computer to a shopping server having a database;
   selecting plural products through an integrated shopping interface, based on product information in the database, for purchase from plural merchant servers that are remote from the shopping server;
   verifying the product information related to the selected products selected in said selecting step by communicating updated information related to the selected products from the merchant servers to the shopping server;
   presenting verified product information verified in said verifying step to the user for confirmation of a purchase; and
   executing a buy procedure on the merchant servers for purchase of the selected products from the merchant servers if the user confirms the purchase.

2. A method as recited in claim 1, wherein the database comprises a product database having product information and a shopper database having shopper information.

3. A method as recited in claim 2, further comprising the steps of:
   checking if there is account information in the shopper database related to the user for the merchant servers;
   establishing an account related to the user with the merchant servers if said checking step indicates that there is not account information in the shopper database related to the user for the merchant servers; and
   wherein said executing step comprises executing a buy procedure on the merchant computer in association with the account information related to the user for the merchant server.

4. A method as recited in claim 2, further comprising displaying a buy form to the user containing information from the shopper database corresponding to the user and to be used in the buy procedure.

5. A method as recited in claim 2, wherein said executing step comprises manually executing a buy procedure of the merchant servers through an interface of the merchant servers.

6. A method as recited in claim 5, wherein said executing step further comprises filtering out form submissions sent by the merchant servers and filling in the filtered forms with information related to the user from the shopper database.

7. A method as recited in claim 1, wherein said executing step comprises automatically executing a purchase procedure on the shopping server, the buy procedure of the merchant servers being integrated into the purchase procedure.

8. A method as recited in claim 1, wherein said verifying step comprises accessing a checkout page of each of the merchant servers and downloading the products information related to the selected product from the checkout pages.

9. A method as recited in claim 1, further comprising the steps of:
   establishing a first cookie on the shopping server containing a merchant server session identification;
   establishing a second cookie on the client computer identifying a user session between the client computer and the shopping server corresponding to the merchant serve identification; and
   correlating the second cookie with a transaction record established in connection with the first cookie.

10. A method as recited in claim 1, further comprising the steps of:
    spawning a buy process in the shopping server for accomplishing said selecting step; and
    updating a transaction record based on the status of the buy process.

11. A computer architecture for effecting commerce in a networked environment comprising:
    a client computer;
    a shopping server executing an agent server application, said shopping server including a memory device having a database stored therein;
    plural merchant servers executing a commerce server application and being remote from said shopping server; and
    a communication channel coupling said merchant servers with said shopping server and said shopping server with said client computer;
    wherein, said agent server application is operative to permit the user of said client computer to select a plural products through an integrated shopping interface based on product information in said database for purchase from said merchant servers, verify the product information related to the selected product by requesting updated information related to the selected product from said merchant servers over said communication channel, present verified product information to the user for confirmation of a purchase, and execute a buy procedure on said merchant servers for purchase of the selected products from said merchant server if the user confirms the purchase.

12. An architecture as recited in claim 11, wherein said agent server application is operative to identify the user of said client computer.

13. An architecture as recited in claim 11, wherein said database comprises a product database having product information and a shopper database having shopper information.

14. An architecture as recited in claim 13, wherein said agent server application is operative to display a buy form to the user containing information from the shopper database corresponding to the user and to be used in the buy procedure.

15. An architecture as recited in claim 13, wherein said agent server application is operative to check if there is account information in said shopper database related to the user for said merchant servers, establish an account related to the user with said merchant servers if there is not account information in said shopper database related to the user for said merchant servers, and execute a buy procedure on said merchant servers in association with the account information related to the user for said merchant server.

16. An architecture as recited in claim 11, wherein said agent server application is operative to automatically execute a purchase procedure on said shopping server, the buy procedure of said merchant servers being integrated into the purchase procedure.

17. An architecture as recited in claim 11, wherein said agent servers application is operative to permit the user to manually execute a buy procedure of said merchant servers through an interface of said merchant server.

18. An architecture as recited in claim 17, wherein said agent server application is operative to filter out form submissions sent by said merchant servers and fill in the filtered forms with information related to the user from said shopper database.

19. An architecture as recited in claim 11, wherein said agent server application is operative to access a checkout page of said merchant servers and download the product information related to the selected product from the checkout pages.

20. An architecture as recited in claim 11, wherein said agent server application is operative to establishing a first cookie on said shopping server containing a merchant servers session identification, establish a second cookie on said client computer identifying a user session between said client computer and said shopping server corresponding to the merchant serve identification, and correlate the second cookie with a transaction record established in connection with the first cookie.

21. An architecture as recited in claim 11, wherein said agent server application includes a main process operative to spawn a buy process for accomplishing selection of products and update a transaction record based on the status of the buy process.

22. An architecture as recited in claim 11, wherein said communication channel comprises the Internet.

23. A method of effecting commerce with at least one of plural merchants in a networked computer environment using a shopping server having an integrated shopping interface, said method comprising the steps of:

selecting a product for purchase from a merchant server that is remote from the shopping server;

communicating information related to the selected product from the merchant server to the shopping server;

presenting to the user a confirmation page containing the information related to the selected product; and executing a buy procedure on the merchant server for purchase of the selected products from the merchant server if the user confirms the purchase.

* * * * *